United States Patent
Pateux et al.

(10) Patent No.: US 9,055,293 B2
(45) Date of Patent: Jun. 9, 2015

(54) PREDICTION OF AN IMAGE BY COMPENSATION DURING FORWARD MOVEMENT

(75) Inventors: Stéphane Pateux, Rennes (FR); Nathalie Cammas, Sens de Bretagne (FR)

(73) Assignee: FRANCE TELECOM, Paris (FR)

( * ) Notice: Subject to any disclaimer, the term of this patent is extended or adjusted under 35 U.S.C. 154(b) by 1033 days.

(21) Appl. No.: 13/124,531

(22) PCT Filed: Oct. 13, 2009

(86) PCT No.: PCT/FR2009/051945
§ 371 (c)(1),
(2), (4) Date: Jul. 5, 2011

(87) PCT Pub. No.: WO2010/043809
PCT Pub. Date: Apr. 22, 2010

(65) Prior Publication Data
US 2011/0255601 A1    Oct. 20, 2011

(30) Foreign Application Priority Data
Oct. 15, 2008 (FR) ...................... 08 56974

(51) Int. Cl.
*H04N 7/26* (2006.01)
*H04N 19/176* (2014.01)
(Continued)

(52) U.S. Cl.
CPC ........... *H04N 19/176* (2014.11); *H04N 19/194* (2014.11); *H04N 19/583* (2014.11)

(58) Field of Classification Search
CPC ...................................................... H04N 7/50
See application file for complete search history.

(56) References Cited

U.S. PATENT DOCUMENTS

| 2007/0160144 A1* | 7/2007 | Lu et al. .................. 375/240.16 |
| 2010/0189172 A1 | 7/2010 | Pateux et al. |
| 2011/0103487 A1 | 5/2011 | Pateux et al. |

FOREIGN PATENT DOCUMENTS

| FR | 2917872 A1 | 12/2008 |
| FR | 2933565 A1 | 1/2010 |

(Continued)

OTHER PUBLICATIONS

Sugimoto K. et al., "Inter Frame Coding with Template Matching Spatio-Temporal Prediction" International Conference on Image Processing, vol. 1, Oct. 24, 2004, pp. 465-468, XP010784855, Piscataway, NJ, USA.

(Continued)

*Primary Examiner* — Sath V Perungavoor
*Assistant Examiner* — Kate Luo
(74) *Attorney, Agent, or Firm* — David D. Brush; Westman, Champlin & Koehler, P.A.

(57) ABSTRACT

A method is provided for predicting an image by compensation during forward movement from at least one reference image. For at least one block of a reference image, referred to as a reference block, the prediction method includes the following steps: determining at least one piece of movement information, representing a movement between said reference block and a matching block in the image to be predicted; determining at least one enlarged block, including the reference block and at least one point of a block adjacent to said reference block in the reference image; and determining a prediction value for at least one point of the image to be predicted from the at least one enlarged block and from the movement information determined for the reference block.

11 Claims, 4 Drawing Sheets

(51) Int. Cl.
*H04N 19/194* (2014.01)
*H04N 19/583* (2014.01)

(56) References Cited

FOREIGN PATENT DOCUMENTS

| | | |
|---|---|---|
| WO | 2005125218 A1 | 12/2005 |
| WO | 2006137020 A2 | 12/2006 |
| WO | 2007077243 A2 | 7/2007 |

OTHER PUBLICATIONS

English Translation of the International Preliminary Report on Patentability and Written Opinion dated May 31, 2011 for corresponding International Application No. PCT/FR2009/051945, filed Oct. 13, 2009.

L.Y. Wei et al., "FastTexture Synthesis using Tree-Structured Vector Quantization" Proceeding of Sig-Graph 2000, pp. 479-488, Jul. 2000.

T.K. Tan et al., "Intra Prediction by Template Matching" Proceedings of ICIP 2006, pp. 1693-1696, 2006.

French Search Report and Written Opinion dated Aug. 18, 2009 for corresponding French Application No. FR 0856974 filed Oct. 15, 2008.

International Search Report dated Feb. 15, 2010 for corresponding International Application No. PCT/FR2009/051945, filed Oct. 13, 2009.

* cited by examiner

PREDICTION OF AN IMAGE BY COMPENSATION DURING FORWARD MOVEMENT

CROSS-REFERENCE TO RELATED APPLICATIONS

This Application is a Section 371 National Stage Application of International Application No. PCT/FR2009/051945, filed Oct. 13, 2009 and published as WO 2010/043809 on Apr. 22, 2010, not in English.

FIELD OF THE DISCLOSURE

The field of the disclosure is that of image processing.

More specifically, the disclosure pertains to prediction techniques implementing forward motion compensation.

The disclosure can be applied especially in the field of the encoding and decoding of a video stream, consisting of a series of successive images, in next-generation video encoders (H.265 or ISO-MPEG type encoders).

BACKGROUND OF THE DISCLOSURE

Here below, a description is given of the prior art pertaining to the prediction of images in the field of the encoding or decoding of image sequences.

There already exist known hybrid video encoding schemes wherein the images are encoded in two phases, the first phase being a phase of prediction by motion compensation followed by a second phase of encoding of prediction residues.

Figure 1A:
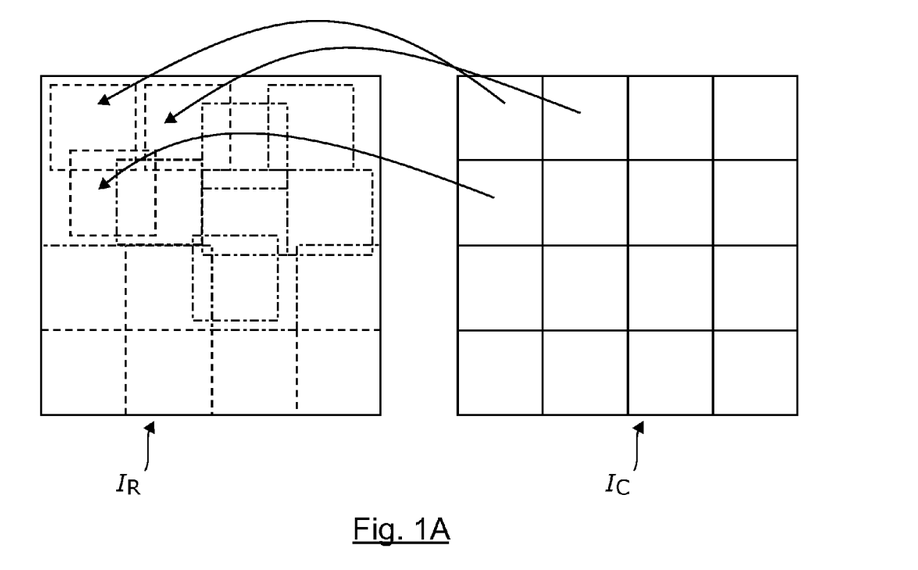
FIGS. 1A and 1B already commented upon with reference to the prior art illustrate the techniques of motion compensation by forward and backward projection respectively.

Among the motion compensation techniques, there is the known method of motion compensation known as "backward motion compensation", an example of which is illustrated schematically in FIG. 1A. Backward motion compensation enables the prediction of an image Ic from at least one reference image Ir taking account of the shift vectors pointing from the current image to one or more reference images.

This prediction comprises two steps:
the image to be predicted Ic is sub-divided into a set of blocks;
for each block of this image, a prediction is made by means of a shift vector pertaining to a shift relative to the reference image Ir.

Thus, this prediction operation amounts to shifting every point of a block of the reference image by the value of the shift vector associated with the considered block, and makes it possible to give a prediction value to each point of the image to be predicted. A point of the image to be predicted corresponds classically to a pixel.

Figure 1B:
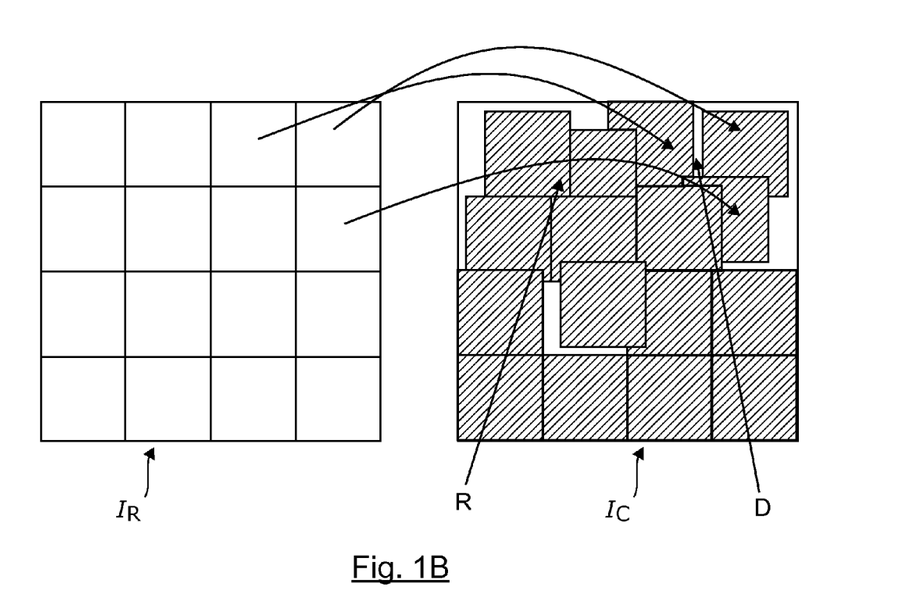

There is also another known motion compensation technique known as "forward motion compensation", an example of which is illustrated schematically in FIG. 1B.

Forward motion compensation enables the prediction of an image Ic from at least one reference image Ir taking account of the shift vectors pointing from one or more reference images Ir to the current image Ic.

This prediction comprises two steps:
the reference image Ir is sub-divided into a set of reference blocks;
for each reference block of the reference image, a shift is made and for each point of this block, the value of the point of the reference image, shifted by the shift vector is allocated to the point of the image to be predicted Ic.

One drawback of this motion compensation technique known as forward motion compensation is that it causes the appearance of overlap zones when several blocks overlap each other, denoted as R in FIG. 1B. Furthermore the use of different shifts on the forward projected blocks also gives rise to non-overlap zones between the blocks, denoted D in FIG. 1B.

The absence of allocation of values in the non-overlap zones limits the performance of the proposed encoding scheme.

The problem of rebuilding values in these non-overlap zones is a well known problem of restoration called "inpainting".

Several solutions have been proposed to this problem.

For example, the document "Fast Texture Synthesis using Tree-structured Vector Quantization", (L. Y. Wei, M. Levoy, Proceedings of the SIG-GRAPH 2000, pp 479-488, July 2000), introduces the technique known as "template matching". This technique makes use of the search for a similar pattern in a reference image from known observations in a neighborhood of the zone to be rebuilt.

This technique has three steps:
defining a "template" of information already known in the neighborhood of a set of pixels to be rebuilt (2×2 sized block in the image in the cited document);
searching in a search zone for a zone similar to the template (candidate neighborhood);
assigning, to the pixels to be rebuilt, values of the block associated with the most similar zone sought.

The document "Intra prediction by template matching", (T. K. Tan, C. S. Boon, Y. Suzuki, Proceedings of the ICIP 2006, pp 1693-1696), extends this technique to an H.264 encoder in intra mode. This technique offers high quality of restoration.

However, one drawback of these prior art techniques is the complexity of their implementation which requires a search for a "template" to be used, this search being made through techniques of searching for the maximum of the correlation product from amongst a large number of candidates. Thus, this technique has a complexity that is too high to be effective.

SUMMARY

An embodiment of the invention proposes a novel approach which does not have all these drawbacks of the prior art.

An embodiment relates to a method for predicting an image by forward motion compensation from at least one reference image.

According to an embodiment of the invention, such a method implements the following steps for at least one block of a reference image called a reference block:
determining at least one piece of shift information, representing a shift between the reference block and a corresponding block in the image to be predicted;
determining at least one enlarged block, comprising the reference block and at least one point of a block adjacent to the reference block in the reference image;
determining a value of prediction for at least one point of the image to be predicted from the enlarged block or blocks and the piece or pieces of shift information determined for the reference block.

An embodiment of the invention thus proposes a novel technique of prediction by forward motion compensation that makes use of a low-complexity space/time prediction.

To this end, an embodiment of the invention proposes to define a sub-division for the reference image into a set of reference blocks of arbitrary shape. These reference blocks can especially be of different sizes. It is also possible that all these reference blocks will totally or not totally overlap the reference image and that the blocks will or will not overlap one another.

For the sake of simplification, and nonlimiting, the reference image will be associated with a set of square-shaped reference blocks, of fixed size, which do not overlap and which overlap all the reference image.

For a reference block, and for example for all the reference blocks, a piece of shift information is determined representing a shift between the reference block and a corresponding block in the image to be predicted. For example, the shift information may represent a shift belonging to the group comprising:
  a translational motion;
  an affine deformation;
  a homographic deformation;
  a parametrical model of deformation;
  a rotation;
  a shear motion.

In particular, the proposed technique is used to determine an enlarged block for which a forward motion compensation is made in the image to be predicted. This enlarged block comprises at least a reference block and at least one point (or pixel) of a block neighboring the reference block in the reference image.

Thus, a prediction value is determined for at least one point of the image to be predicted from the enlarged block and the shift information relative to the reference block. In particular a prediction method of this kind makes it possible to rebuild the points that are non-overlapped, i.e. not predicted in the case of a classic forward motion compensation.

An embodiment of the invention can be applied especially to the encoding of image sequences or scenes making use of a prediction technique based on forward motion compensation, or else represented by means of motion tubes, a motion tube corresponding to a block of pixels progressing in the course of time. During this progress, the tube can get deformed, for example to take into account the apparent motion or else if the number of pixels present in the zone predicted by the tube increases or decreases in terms of number of pixels. This tube can also get refined, for example by passing to the sub-pixel level of the block. An embodiment of the invention makes it possible especially to determine the deformations undergone by the tube.

In particular, it may be recalled that a motion tube is defined by at least the following pieces of information:
  a reference block of pixels comprising reference texture information;
  instants of starting and ending of the tube;
  information on transition enabling the updating of said reference block at least one instant t of said sequence.

Such a technique for representing image sequences is described especially in the French patent application No. 0756007 filed on 25 Jun. 2007 on behalf of the same Applicant.

According to one particular characteristic of an embodiment of the invention, the prediction method implements:
  a first prediction run using at least one reference block delivering a first predicted image;
  a step for detecting at least one non-predicted point in the first predicted image;
  and, in the event of positive detection, a second prediction run by means of at least one enlarged block, so that the second run determines the value of at least one of the non-predicted points.

For example if, during a first run, at least one point of the first predicted image is non-predicted, a black zone is obtained on the first predicted image. This region is detected by a piece of information revealing the presence of a non-predicted points (or absence of prediction). Then, in the reference image, at least one enlarged block is determined in the neighborhood of the point corresponding to this non-predicted point in the predicted image. In other words, the block corresponding to the enlarged block in the predicted image contains this non-predicted point.

According to one particular embodiment, the shift information representing a shift between said reference block and a corresponding block in the image to be predicted comprises a set of control vectors, each representing a shift between a characteristic point of said reference block or of a sub-block of said reference block, and a corresponding position of said characteristic point in the image to be predicted.

For example, the control vectors for the block or sub-block are each associated with one of the vertices of the block or sub-block. Thus, for a 2D image, four control vectors are associated with the block, one control vector being associated with each vertex or corner of the block. For a 3D image, eight vectors are associated with the block, which actually corresponds to a cube, one control vector being associated with each corner of the block. It is also possible to associate these control vectors with other points of the block, corresponding for example to a contour. Similarly, the number of control vectors associated with a block is not fixed.

Thus, during the implementation of the prediction by forward motion compensation, the control vectors point to one or more of the reference images in the images to be predicted. Then, a plurality of control vectors is determined for a given block belonging to a reference image.

According to one particular aspect of an embodiment of the invention, the enlarged block is determined by implementing a technique belonging to the group comprising:
  a shifting of all the ridges of the reference block by a same distance;
  a shifting of at least one ridge of the reference block.

For example, it is possible to enlarge a block evenly, i.e. each edge of the reference block is shifted identically.

According to one variant, it is possible to adapt the enlarging of the reference block in a particular direction, for example upwards, towards the right or even to combine the upward and downward direction which amounts to shifting two ridges.

The application of the enlarging operation can be done systematically and/or applied in the case of a positive detection of a non-overlap zone.

For example, if a non-predicted point (corresponding to a non-overlap zone) is situated "above" the considered block, the enlarged block is determined by shifting at least one ridge of the reference block upwards, i.e. the enlarging of the block is designed to encompass the non-predicted point. Thus, the width of enlarging can be adapted to the distance from the non-overlap zones in the neighborhood of the considered block. Finally, when there is no non-overlap zone in the neighborhood of the considered block, no enlarging is applied and the operation passes to another block.

According to one particular aspect of an embodiment of the invention, the shifting of at least one ridge takes account of at least one of the control vectors. For example, a prediction that uses a piece of shift information representing a shift between the reference block and a corresponding block, where this shift is characterized as an upward and leftward shift, will associate a block enlarged upward and leftward. Thus, the enlarging of the block will be adapted to the shifting considered between the reference block and a corresponding block in the image to be predicted.

Furthermore, according to one particular aspect of an embodiment of the invention, when at least two prediction values are determined for a same point of the image to be predicted, said method comprises a step for predicting said point taking into account some values of trust, each assigned to said prediction values.

Another aspect of an embodiment of the invention pertains to a method of encoding which implements the prediction method described here above for at least one block of a reference image.

More specifically, the prediction of a current image delivers a predicted image. Optionally, the prediction operation is followed by the following steps:
- determining at least one prediction residue by comparison of the current image and the predicted image;
- encoding the prediction residue;
- transmitting and/or storing a signal comprising the prediction residue coming from the encoding step.

According to one particular aspect of an embodiment of the invention, the encoding method implements a step of insertion into said signal of a piece of information representing the use of at least one enlarged block and/or of the enlargement assigned to the enlarged block for a given reference block.

Thus, this piece of information may for example take the form of a signaling bit, of which the value "1" signals the enlarging of the block concerned and the value "0" signals the reverse, and/or the form of a byte indicating the type of enlargement performed.

Furthermore, optionally, the signal comprises the prediction residue or residues obtained by comparison of the current image and the predicted image.

In another embodiment, the invention pertains to a device for encoding a sequence of images, implementing a prediction by forward motion compensation from at least one reference image and comprising, for at least one block of a reference image called a reference block:
- means for determining at least one piece of shift information, representing a shift between the reference block and a corresponding block in the image to be predicted;
- means for determining at least one enlarged block, comprising the reference block and at least one point of a block adjacent to the reference block in the reference image;
- means for determining a value of prediction for at least one point of the current image from the at least one enlarged block and the piece or pieces of shift information determined for the reference block, delivering a predicted image.

According to one variant, such a device also comprises:
- means for determining at least one prediction residue by comparison of the current image and the predicted image;
- means for encoding the at least one prediction residue;
- means for transmitting and/or storing a signal comprising the prediction residue or residues coming from the encoding step.

An encoding device such as this is adapted especially to implementing the method of encoding described here above. It is for example an MPEG or H.264 type video encoder or a device according to a future video compression standard (H.265 or ISO-MPEG).

Another aspect of an embodiment of the invention pertains to a signal representing a sequence of images encoded according to the encoding method described here above. This signal comprises a piece of information representing the use of at least one enlarged block and/or of the enlargement assigned to the enlarged block for a given reference block.

This signal could of course comprise the different characteristics of the encoding method according to an embodiment of the invention.

In particular, this signal can carry said residue or residues of prediction coming from the encoding step. According to one variant of the invention, such a signal also comprises at least one piece of information for rebuilding control vectors for the given block.

Another aspect of an embodiment of the invention concerns a recording medium bearing a signal as described here above.

In another embodiment, the invention pertains to a method for decoding a signal representing a sequence of images, comprising a step for rebuilding at least one image of the sequence, from a prediction of the image to be rebuilt, said prediction associating a block of the image to be rebuilt with at least one corresponding block in a reference image of the sequence.

Such a decoding method implements the prediction of at least one image of said sequence, implementing the prediction method described here above, delivering a predicted image.

According to one variant, such a method also implements the following steps:
- decoding at least one prediction residue;
- adding the residue to the predicted image, delivering a rebuilt image.

Such a method is especially suited to decode a sequence of images encoded according to the above-described encoding method.

In this way, the same prediction steps are performed as those performed when encoding so as to rebuild the given block, and optionally by adding the prediction residue (transmitted in the signal) to the prediction.

In particular, it is possible to extract from the signal, during the decoding, at least one piece of information for rebuilding control vectors for a given block, or motion tubes, in order to process information on transition of these tubes and, for each tube, to rebuild a potentially deformed current block in the image to be rebuilt.

According to one aspect of an embodiment of the invention, such a decoding method implements a step for extracting a piece of information representing the use of at least one enlarged block and/or of the enlargement assigned to the enlarged block for a given reference block, and the prediction step takes account of this piece of information.

In another embodiment, the invention pertains to a device for decoding a signal representing a sequence of images, implementing a prediction by forward motion compensation from at least one reference image.

For at least one block of a reference image, called a reference block, this device comprises:
- means for determining at least one piece of shift information, representing a shift between said reference block and a corresponding block in an image to be predicted;
- means for determining at least one enlarged block, comprising said reference block and at least one point of a block adjacent to said reference block in said reference image;
- means for determining a value of prediction for at least one point of the image to be predicted, from said at least one enlarged block and said piece or pieces of shift information determined for said reference block, delivering a predicted image.

According to one variant, such a device also comprises:
- means for decoding at least one prediction residue; and means for adding said at least one residue in the predicted image, delivering a rebuilt image.

Such an encoding device is adapted especially to implementing the method of decoding described here above. It is for example an MPEG or H.264 type decoder or a device according to a future video compression standard (H.265 or ISO-MPEG).

An embodiment of the invention also pertains to one or more computer programs comprising instructions for the implementing of a prediction method and/or an encoding method and/or a decoding method respectively, as described here above. For example, such programs are downloadable from a communications network and/or stored on a computer-readable carrier and/or executable by a processor.

BRIEF DESCRIPTION OF THE DRAWINGS

Other features and advantages shall appear clearer from the following description of a particular embodiment, given by way of an indicative and non-exhaustive example and from the appended drawings, of which.

DETAILED DESCRIPTION OF ILLUSTRATIVE EMBODIMENTS

1. General Principle

The general principle of an embodiment of the invention relies on a prediction by forward motion compensation making use of a space/time prediction of low complexity.

More specifically, an embodiment of the invention proposes to determine a prediction of a current image from an enlarged block of a reference image, i.e. a block of the reference image comprising a reference block and at least one pixel of a block adjacent to the reference block in the reference image.

It may be recalled that, classically, the use of different shifts on the forward projected blocks gave rise to non-overlap zones between the blocks. The technique proposed according to an embodiment of the invention gives a predicted image devoid of non-overlap zones or at least comprising a number of non-predicted zones smaller than those of the prior art techniques.

Here below, referring to FIG. 2A, a description is provided of the main steps implemented generally for the prediction by forward motion compensation according to one embodiment of the invention.

Figure 2A:
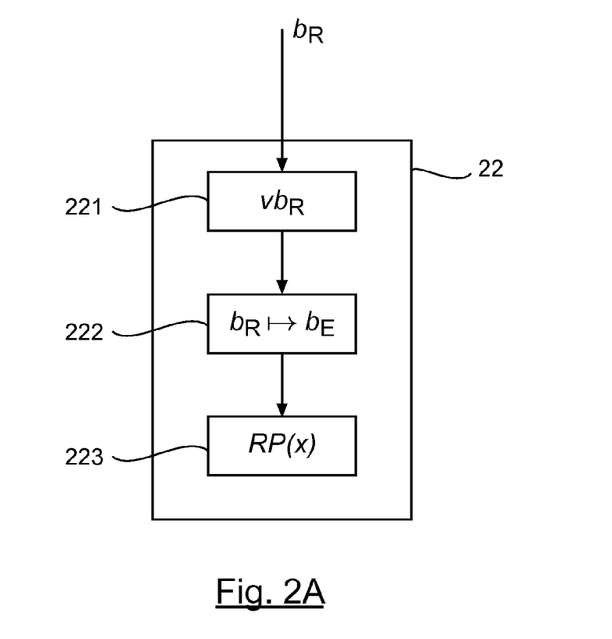
FIGS. 2A and 2B present the main steps of the prediction by forward motion compensation according to one embodiment of the invention.

As illustrated in FIG. 2A, the prediction (22) by forward motion compensation, done from at least one reference image and for at least one block of this reference image known as a reference block $b_R$, comprises the following steps:

determining 221 at least one piece of shift information $vb_R$ for the block $b_R$, representing a shift between the reference block and a corresponding block in the image to be predicted;

determining 222 at least one enlarged block $b_E$, comprising the reference block and at least one point of a block adjacent to the reference block in the reference image;

determining 223 a value of prediction $RP(x)$ for at least one point of the image to be predicted, from the enlarged block or blocks and the piece or pieces of shift information determined for the reference block.

Figure 2B:
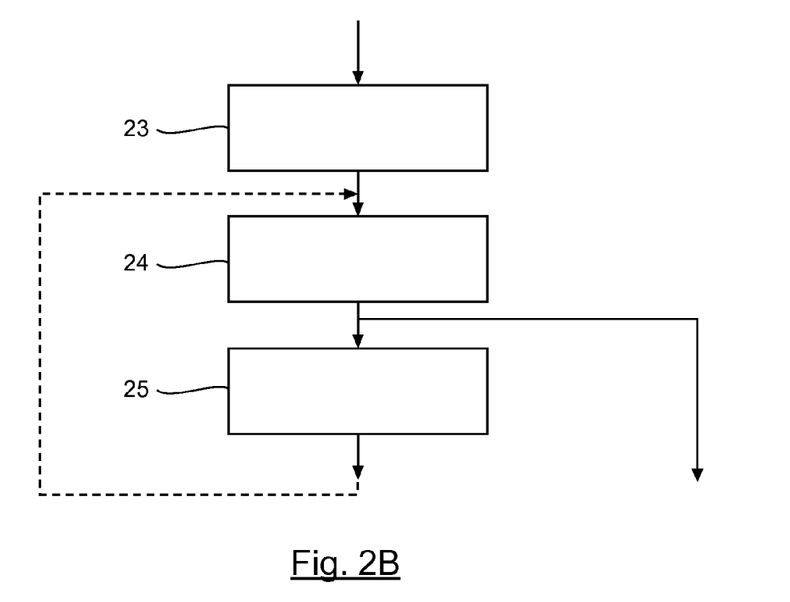

More specifically, FIG. 2B illustrates an embodiment of the invention in which the prediction method implements:

a first prediction run (23) using at least one reference block delivering a first predicted image;

a detection step (24) for detecting a non-predicted point in the first predicted image;

and, in the event of positive detection (25), a second prediction run using at least one enlarged block so that the second run determines the value of at least one of the non-predicted points.

The method of an embodiment of the invention can also be implemented in various ways especially in wired form or in software form.

2. Detailed Description of One Embodiment of the Prediction Method

Here below we present a particular embodiment of the prediction method.

A) Sub-Division of a Reference Image into Blocks

We consider a reference image Ir sub-divided into a set of blocks, each comprising at least two pixels.

A block may have an arbitrary shape, for example a square or rectangular shape. The size of the blocks may be variable, for example 4×4, 8×8, 16×4, 16×16. The blocks of the reference image may be of different sizes. The set of blocks may overlap the reference image totally or not totally and the blocks may or may not overlap each other.

For the sake of simplification, here below we consider (nonlimiting) a set of square blocks, of fixed size, that do not overlap each other and overlap the entire reference image.

B) Forward Projection of the Blocks of the Reference Image

During a first prediction run, the blocks of the reference image Ir are scanned and for each block, a forward projection is made in an image to be predicted Ic.

To achieve this, first of all a piece of information, representing the motion between a block of the reference image, known as a reference block, and a corresponding block in the image to be predicted, is determined.

Naturally, this forward projection can be done by means of different models of motion, for example a translation, an affine deformation etc.

It is considered for example that the motion model is defined by a set of control vectors as described in the French application No. 0854465 filed on 1 Jul. 2008 on behalf of the same Applicant.

The shift information, representing the shift between the reference block and a corresponding block in the image to be predicted, then comprises a set of control vectors, each representing a shift between a characteristic point of the reference block or of a sub-block of the reference block, and a corresponding position of the characteristic point in the image to be predicted.

Figure 3A:
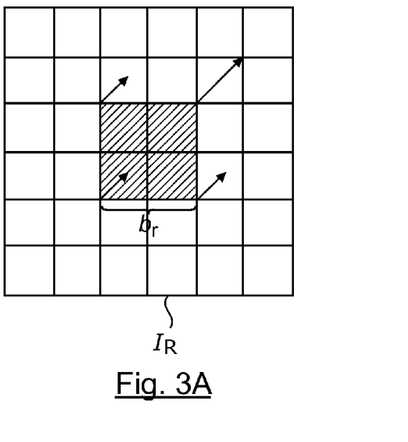
FIGS. 3A and 3B illustrate the projection of a block according to one embodiment of the invention.

For example, FIG. 3A considers a set of control vectors represented by arrows for a reference block $b_R$ considered (hatched block, comprising four sub-blocks). These control vectors define a motion towards the top right-hand.

The forward projection implements different steps. P=Ir denotes the reference image to be given forward compensation, RI the intermediate image which corresponds to an accumulation image weighted with the prediction values, RW is the weighted accumulation image of the weighting factors used.

First of all, the current image to be predicted is initialized. Thus, for any pixel x of the image, we have RI(x)=0, RW(x)=0.

Then, for any reference block (or sub-block) considered, the motion model considered, in this case the set of control vectors, is associated. Thus, for any pixel x of the block (or sub-block) considered, the rebuilt image is updated as indicated by the following equations:

$$RI(x) = \sum_i w_i(x) P(x + v_i)$$

$$RW(x) = \sum_i w_i(x)$$

where: the vectors $v_i$ correspond to the control vectors i,
the values $w_i$ correspond to the weighting values between the different predictions obtained by the different controlled vectors.

The weighting values $w_i$ are generally dependent on the position of the point x considered in the block.

Figure 3B:
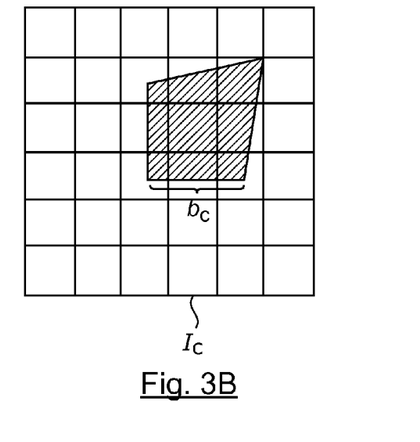

For example, if we consider the block $b_r$ of FIG. 3A, we then obtain schematically, by projection, the block $b_c$ of the image Ic shown in FIG. 3B (hatched block) projected along the control vectors representing a movement towards the top right-hand.

Once all the blocks of the image have been scanned, a step is performed to normalize the image for any pixel x of the image, such that:

$$RP(x) = \frac{RI(x)}{RW(x)}$$

The predicted image denoted as RP is deemed to be completely rebuilt if, for any point x of the image, RW (x)≠0.

The weighting values used may be adapted to obtain a smoother prediction. For example, we may consider especially:
$w_i(x)=1$ for a uniform contribution of each prediction;
$w_i(x)=f(d(x,b))$ where f is a decreasing function of the distance d(x,b) of the non-predicted point x at a point representing the considered block b. This point representing the considered block b may for example be localized at the center of this block in the middle of a ridge of this block or at one of its vertices. We thus obtain a measurement of prediction linked to the proximity of the block propagating its prediction.

Naturally, other forward motion compensation techniques can be used for this first run, especially a classic technique of motion compensation as described with reference to the prior art.

C) Identification of the Non-Overlap Zones

The projection of each block can use different motions, leading to non-overlap zones (denoted D with reference to FIG. 1B). In other words, these zones correspond to zones not rebuilt during the first prediction run (denoted 23 with reference to FIG. 2B). For example, these zones may take the form of black regions following the first prediction run.

These zones can be identified by a detection step (denoted 24 with reference to FIG. 2B) using for example the image RW of accumulation of the weighting factors defined during the first prediction run. Thus, the set of non-overlap zones corresponds to the set of points where we have RW(x)=0.

If no non-overlap zone is identified, then the image is completely rebuilt (or predicted) and then the residues can be encoded.

In the case of a positive detection of a non-overlap zone, i.e. at least one non-predicted point, a second prediction run 25 is done using at least one enlarged block.

D) Forward Projection of Enlarged Blocks

During this second prediction run 25, according to this embodiment, the blocks of the reference image are scanned and a forward projection is made in an intermediate image of the texture information of an enlarged version of a considered reference block. The blocks or sub-blocks used during the first run 23 are resumed.

First of all, the image to be rebuilt is initialized, i.e. for every value x of the image, we assume RI2(x)=0, RW 2(x)=0, where RI2 and RW2 respectively represent the intermediate image of weighted accumulation of the prediction values and the intermediate image of accumulation of the weighting factors used during the second run 25.

Then, for each considered reference block, the enlargement of this block is defined. For example, given the considered embodiment which implements a set of control vectors for each block, we may consider an enlargement as a function of these control vectors.

Thus, as defined here above, the set of control vectors represented by arrows for the reference block $b_r$ of the reference image $I_r$, is considered.

For example, if the considered reference block $b_r$ and the block situated above have a common ridge both in the reference image and in the predicted image after motion compensation, then it means that two blocks are connected vertically. In this case, the block $b_r$ is not enlarged towards the top. If not, the block is enlarged by enlarging the reference block $b_r$ upwards.

If the considered reference block $b_r$ and the block situated to its left have a common ridge both in the predicted image and in the reference image after motion compensation, then it means that two blocks are connected horizontally. The block therefore is not enlarged towards the left. If not, the block is enlarged by the leftward enlargement of the reference block $b_r$.

If the considered reference block $b_r$ and the block situated to its right have a common ridge both in the predicted image and in the reference image after motion compensation, then it means that two blocks are connected horizontally. The block therefore is not enlarged towards the right. If not, the block is enlarged by the rightward enlargement of the reference block $b_r$.

If the considered reference block $b_r$ and the block situated beneath it have a common ridge both in the predicted image and in the reference image after motion compensation, then it means that the two blocks are connected vertically. Consequently, the block is not enlarged downwards. If not, the block is enlarged in enlarging the reference block $b_r$ downwards.

Then, the projection of the enlarged block is done.

It can be noted that the motion parameters on the enlarged block may be different from those on the original reference block. For example, in the case of a bilinear motion defined by a set of control vectors, with a control vector at each corner of a reference block, the values of the motion vectors at the corners of the enlarged block may be different, in order that the motion field interpolated within the enlarged block will be consistent with the one obtained on the reference block.

Thus, for any pixel x of the considered block (or sub-block), the rebuilt image is updated on the basis of the enlarged blocks:

$$RI2(x) = \sum_i w_i(x)P(x+v_i)$$

$$RW2(x) = \sum_i w_i(x)$$

Once all the blocks of the image are scanned, a step for normalizing the image for any pixel x of the image is performed.

As indicated here above, the used weighting values may be adapted to perform a smoother prediction.

E) Definition of the Prediction Values in the Non-Overlap Zones

It is also possible to carry the new obtained values into non-rebuilt zones during the first prediction run.

Thus, for any point x of the image to be rebuilt such that RW(x)=0, the rebuilt values defined by RI(x)=RI2(x)/RW2(x).

Should RW2(x) be zero, the value RI(x) remains indefinite.

In other words, the new predicted image RP2 is deemed to be completely rebuilt if, for any value x of the image, RW2(x)≠0.

It is then possible to implement a classic technique of backward motion compensation or use new tubes through the new values obtained during the second prediction run.

It is also possible to apply a new step 24 of detection of non-overlap zones in the image RP2 in order to determine whether there are any remaining non-overlap zones in the predicted image RP2.

In the case of a positive determination, the step 25 (or any other inpainting technique) is again implemented, using new enlarged blocks, taking account of the points rebuilt in the image RP2 for example.

Thus, in one particular embodiment, the steps 24 and 25 may be implemented iteratively.

3. Determining Enlarging Blocks

There are several options available for determining the enlarged block. A few examples are presented here below with reference to FIGS. 4A, 4B and 4C.

Figure 4A:
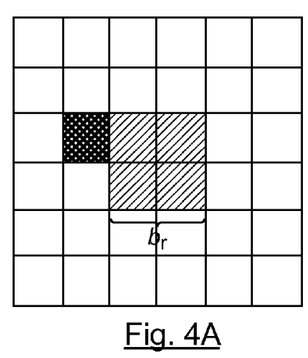
FIGS. 4A to 4C illustrate examples for determining an enlarged block.

More specifically, FIG. 4A represents a portion of a reference image Ir and a reference block $b_R$ (hatched block) sized 2×2 pixels.

This same figure also shows a point corresponding to a non-predicted point identified in the image to be predicted (RW (x)=0, a squared pixel situated to the left in the reference block) detected during the detection step 24. Indeed, it may be recalled that the points of the non-overlap zones are identified in the image to be predicted. Here below, for such a point in the image to be predicted, we may consider the point in the reference image corresponding to this non-predicted point by applying to it the backward motion of a neighboring considered block. Several neighboring blocks may be considered in this operation, leading to the identification of several points in the reference image.

For the sake of simplification, here below we consider only the case of an association with a single neighboring block. In the case of association with several neighboring blocks, the same operation is performed for each of the neighboring considered blocks.

Figure 4B:
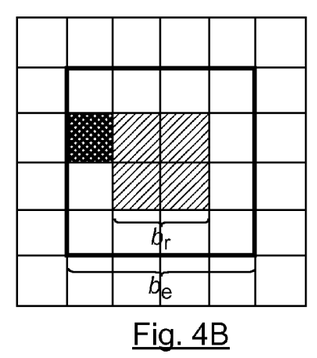

FIG. 4B shows a first example of an enlarged block $b_E$ (framed in bold black lines), sized 3×3, implementing an identical shift for all the ridges of the reference block $b_R$ (in a 2D representation here). Thus, the non-predicted point is included in the enlarged block.

Thus, during the second prediction run 25, the non-predicted pixel will be rebuilt by forward projection of the enlarged block.

Figure 4C:
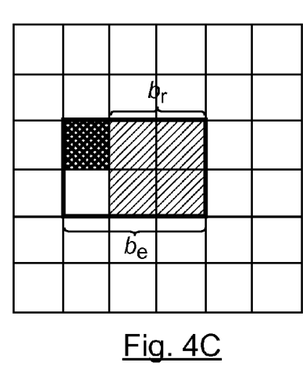

FIG. 4C shows a second example of enlarged block $b_E$ (framed in bold), sized 3×2, implementing a shift of a single ridge, the left-hand ridge. Again, the enlarging is defined so as to include the non-predicted point identified in the enlarged block.

The enlarged block of FIG. 4C is smaller than that of FIG. 4B, thus accelerating the second prediction run 25.

However, the use of the enlarged block of FIG. 4B may enable the rebuilding of additional non-predicted points.

The definition of the enlarging can be implemented systematically, i.e. all the blocks are enlarged in the same way, or it may be an adaptive enlarging in which the width of the enlargement is adapted to the presence or absence of non-overlap zones or else to the type of control vector representing the motion of the considered block (upward motion or rightward motion, downward and leftward motion, leftward motion etc). For example if, in the neighborhood of the considered block, there is no non-overlap zone, the block is not enlarged.

It may be noted that, according to the proposed technique the considered neighborhood, in the non-overlap zone, does not occupy a predefined position (for example an anti-causal neighborhood, the anti-causal zone being the zone of the image comprising blocks situated after the current block, in the predetermined direction of scanning of the blocks in the image.

Furthermore, in a zone to be rebuilt, for a same pixel, several values can be combined (with weighting of each of the values) to define the value of the current pixel.

Furthermore, no search is made for the best candidate, since the candidate is defined automatically.

The proposed technique therefore makes it possible to have operations of restoration that are more homogenous and that do not emphasize a textural propagation in a predetermined sense.

4. Encoding

The prediction technique described can be used by a video encoder.

In one particular embodiment, such an encoder implements the following steps for a current image of an image sequence:
- prediction of the current image, implementing the prediction method described here above delivering a predicted image;
- determining at least one prediction residue by comparison of the current image with the predicted image;
- encoding at said least one prediction residue;
- transmission and/or storage of a signal comprising the prediction residue or residues coming from the encoding step.

5. Signal

Once coded, the images of the sequence are transmitted to a decoder.

Figure 5:
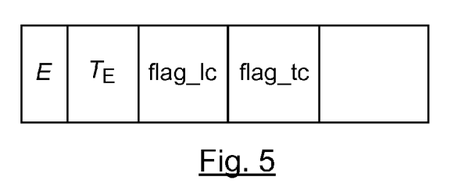
FIG. 5 presents the structure of a signal according to one particular embodiment of the invention.

Referring to FIG. 5, we present according to one embodiment, for a block of the image to be rebuilt, the syntax associated with a signal carrying a piece of information representing the use of at least one enlarged block and/or of an enlargement assigned to the enlarged block for a given reference block.

In the context where the encoder and the decoder implement a same mechanism for detecting non-overlap zones, it is possible to allow the encoder and the decoder to identify the blocks to be enlarged. In this case, an encoding/decoding syntax is specified at the level of the header of a slice (each image being able to be sub-divided into slices) or of the image sequence, indicating that the decoder should use the enlarged blocks, as well as the mechanism for identifying these enlargements. This identification mechanism can also be defined by the representation standard used.

This information can for example take the form of a signaling bit E whose value "1" signals the enlargement of the block considered and "0" the inverse and/or a byte $T_E$ indicating the type of enlargement performed.

According to the embodiment shown, rebuilding information elements of the control vectors associated with the motion of the considered reference block $b_R$ are also inserted into this signal. For example, these rebuilding information elements include the flags denoted as $flag_{13}lc$ and flag_tc as described in the French patent application No. 0854465 filed on 1 Jul. 2008 mentioned here above.

According to the embodiment, optionally (and not shown here), the prediction residue or residues obtained by comparison of the current image and the predicted image are also inserted.

6. Decoding

Figure 6:
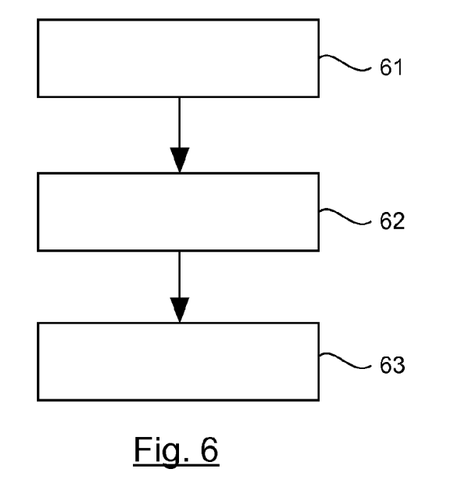
FIG. 6 presents the main steps of the decoding method according to one embodiment of the invention.

Referring now to FIG. 6, we present the main steps of decoding implemented in a video decoder.

It is assumed that the decoder receives a signal representing an image sequence encoded for example according to the encoding method described here above.

Generally, the received signal does not have any prediction residue. FIG. 6 shows a decoding method in which the signal optionally has at least one prediction residue.

Thus, in this embodiment, the method of decoding according to the invention comprises a step 61 for decoding at least one prediction residue. A prediction step 62 according to the prediction method described here above succeeds the decoding step 61. Finally, a step 63 is implemented in order to add the decoded residue or residues in the predicted image.

Such a method can be implemented in various ways, especially in wired or software form.

7. Structures of the Encoder and Decoder

Figure 7:
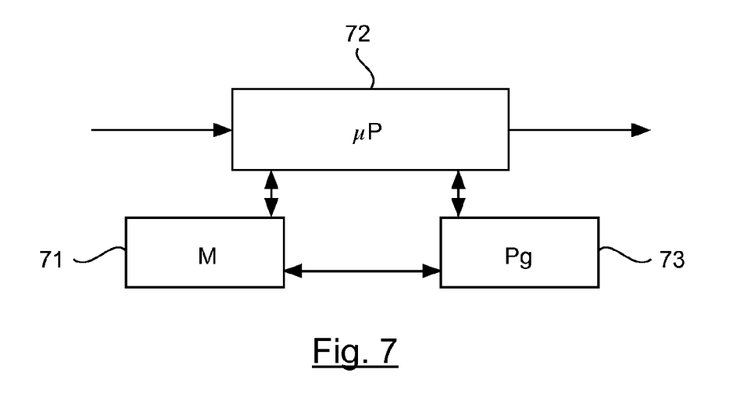
FIGS. 7 and 8 present the structure of an encoding device and a decoding device according to one particular embodiment of the invention.
Figure 8:
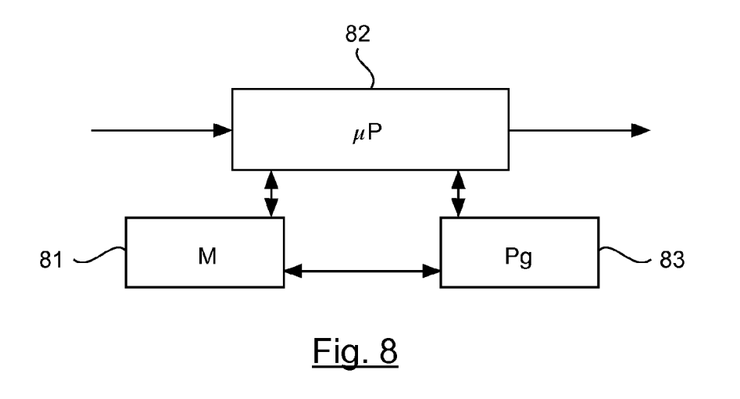

Finally, referring to FIGS. 7 and 8, we present simplified structures of an encoding device and a decoding device respectively implementing an encoding technique and a decoding technique as described here above.

An encoding device as illustrated in FIG. 7 comprises a memory 71 comprising a buffer memory, a processing unit 72 equipped for example with a microprocessor µP, and driven by the computer program 73, implementing the encoding method according to an embodiment of the invention.

At initialization, the code instructions of the computer program 73 are for example loaded into a RAM and then executed by the processor of the processing unit 72. The processing unit 72 inputs at least one image to be encoded or a block of an image to be encoded. The microprocessor of the processing unit 72 implements the steps of the encoding method described here above according to the computer program instructions 73, to determine a prediction of the image or of the block to be encoded, and encodes the corresponding block or image. To this end, the encoding device comprises, in addition to the buffer memory 71, at least means for determining at least one piece of shift information representing a shift between a reference block and a corresponding block in the current image, means for determining at least one enlarged block, means for determining a value of prediction for at least one point of the current image, on the basis of enlarged blocks and of the information or pieces of shift information determined for the reference block, delivering a predicted image. These means are driven by the microprocessor of the processing unit 72.

A decoding device as illustrated in FIG. 8 comprises a memory 81 constituted by a buffer memory, a processing unit 82 equipped for example with a microprocessor µP and driven by the computer program 83 implementing the method for receiving according to an embodiment of the invention.

At initialization, the code instructions of the computer program 83 are for example loaded into a RAM and then executed by the processor of the processing unit 82. The processing unit 82 inputs a signal representing a sequence of images comprising information representing the use of at least one enlarged block and/or of the enlargement assigned to the enlarged block for a given reference block. The microprocessor of the processing unit 82 implements the steps of the decoding method described here above according to the computer program instructions 83 to determine a prediction of the given block, and rebuilds the corresponding image. To this end, the decoding device comprises, in addition to the buffer memory 81, at least means for determining at least one piece of shift information representing a shift between a reference block and a corresponding block in a current image, means for determining at least one enlarged block, means for determining a value of prediction for at least one point of the current image, on the basis of enlarged blocks and of the shift information or pieces of shift information determined for the reference block, delivering a predicted image. These means are driven by the microprocessor of the processing unit 82.

Although the present disclosure has been described with reference to one or more examples, workers skilled in the art will recognize that changes may be made in form and detail without departing from the scope of the disclosure and/or the appended claims.

The invention claimed is:

1. A method comprising:
   generating with a coding device a signal representing a sequence of images, comprising by predicting an image by forward motion compensation from at least one reference image, wherein, for at least one block of a reference image, called a reference block, said predicting comprises the following steps:
   determining at least one piece of shift information, representing a shift between the reference block and a corresponding block in the image to be predicted;
   determining at least one enlarged block, comprising said reference block and at least one point of a block adjacent to said reference block in said reference image; and
   determining a value of prediction for at least one point of the image to be predicted, from at least one enlarged block and from the piece or pieces of shift information determined for said reference block,
   wherein the signal comprises at least one piece of information representing the use of at least one enlarged block and/or of the enlargement assigned to the enlarged block for a given reference block; and transmitting said signal by the coding device.

2. A method comprising:

encoding with an encoding device a sequence of images, which implements, for a current image of said sequence, a method of predicting an image by forward motion compensation from at least one reference image, delivering a predicted image, wherein, for at least one block of a reference image, called a reference block, said method of predicting comprises:

determining at least one piece of shift information, representing a shift between the reference block and a corresponding block in the image to be predicted;

determining at least one enlarged block, comprising said reference block and at least one point of a block adjacent to said reference block in said reference image; and determining a value of prediction for at least one point of the image to be predicted, from at least one enlarged block and from the piece or pieces of shift information determined for said reference block, inserting, into a signal representing said sequence of images, a piece of information representing use of at least one enlarged block and/or of the enlargement assigned to the enlarged block for a given reference block.

3. The method according to claim 2, wherein the method implements:

a first prediction run using at least one reference block delivering a first predicted image;

a step of detecting at least one non-predicted point in said first predicted image; and and, in the event of positive detection, a second prediction run by at least one enlarged block, so that the second run determines the value of at least one of the non-predicted points.

4. The method according to claim 2, wherein said shift information comprises a set of control vectors, each representing a shift between a characteristic point of said reference block or a sub-block of said reference block, and a corresponding position of said characteristic point in the image to be predicted.

5. The method according to claim 2, wherein said enlarged block is determined by implementing a technique belonging to the group consisting of:

a shifting of all the ridges of the reference block by a same distance; and a shifting of at least one ridge of the reference block.

6. The method according to claim 5, wherein the shifting of at least one ridge takes account of at least one of said control vectors.

7. The method according to claim 2, wherein when at least two prediction values are determined for a same point of the image to be predicted, said method comprises a step of predicting said point taking into account some values of trust, each assigned to said prediction values.

8. A method comprising:

decoding with a decoding device a signal representing a sequence of images, which implements a method of predicting an image by forward motion compensation from at least one reference image, delivering a predicted image, wherein, for at least one block of a reference image, called a reference block, said method of predicting comprises:

determining at least one piece of shift information, representing a shift between the reference block and a corresponding block in the image to be predicted;

determining at least one enlarged block, comprising said reference block and at least one point of a block adjacent to said reference block in said reference image; and determining a value of prediction for at least one point of the image to be predicted, from at least one enlarged block and from the piece or pieces of shift information determined for said reference block; and extracting from the signal a piece of information representing use and/or enlargement of at least one enlarged block for a given reference block and wherein determining a value of prediction takes account also of this piece of information.

9. A device for encoding a sequence of images, implementing a prediction by forward motion compensation from at least one reference image, wherein, for at least one block of a reference image, called a reference block, said device comprises:

means for determining at least one piece of shift information , representing a shift between the reference block and a corresponding block in the image to be predicted;

means for determining at least one enlarged block, comprising said reference block and at least one point of a block adjacent to said reference block in said reference image;

means for determining a value of prediction for at least one point of the current image from said at least one enlarged block and said piece or pieces of shift information determined for said reference block, delivering a predicted image; and means for inserting, into a signal representing said sequence of images, a piece of information representing use of at least one enlarged block and/or of the enlargement assigned to the enlarged block for a given reference block.

10. A device for decoding a signal representing a sequence of images, implementing a prediction by forward motion compensation from at least one reference image, wherein, for at least one block of a reference image, called a reference block, said device comprises:

means for determining at least one piece of shift information, representing a shift between said reference block and a corresponding block in an image to be predicted;

means for determining at least one enlarged block, comprising said reference block and at least one point of a block adjacent to said reference block in said reference image;

means for determining a value of prediction for at least one point of the image to be predicted, from said at least one enlarged block and said piece or pieces of shift information determined for said reference block, delivering a predicted image; and means for extracting from the signal a piece of information representing use and/or enlargement of at least one enlarged block for a given reference block and wherein determining a value of prediction takes account also of this piece of information.

11. A non-transitory computer-readable medium comprising instructions stored thereon for implementing a decoding of a signal representing a sequence of images, which implements a method of predicting an image by forward motion compensation from at least one reference image when this program is executed by a processor, wherein, for at least one block of a reference image, called a reference block, said method of predicting comprises:
- determining at least one piece of shift information, representing a shift between the reference block and a corresponding block in the image to be predicted;
- determining at least one enlarged block, comprising said reference block and at least one point of a block adjacent to said reference block in said reference image;
- determining a value of prediction for at least one point of the image to be predicted, from at least one enlarged block and from the piece or pieces of shift information determined for said reference block; and
- extracting from the signal a piece of information representing use and/or enlargement of at least one enlarged block for a given reference block and wherein determining a value of prediction takes account also of this piece of information.

* * * * *